United States Patent
Motos et al.

(10) Patent No.: US 12,143,416 B2
(45) Date of Patent: *Nov. 12, 2024

(54) RELAY-ATTACK RESISTANT COMMUNICATIONS

(71) Applicant: Texas Instruments Incorporated, Dallas, TX (US)

(72) Inventors: Tomas Motos, Oslo (NO); Khanh Tuan Le, Nesbru (NO)

(73) Assignee: TEXAS INSTRUMENTS INCORPORATED, Dallas, TX (US)

(*) Notice: Subject to any disclaimer, the term of this patent is extended or adjusted under 35 U.S.C. 154(b) by 0 days.

This patent is subject to a terminal disclaimer.

(21) Appl. No.: 18/352,504

(22) Filed: Jul. 14, 2023

(65) Prior Publication Data

US 2023/0362188 A1    Nov. 9, 2023

Related U.S. Application Data

(63) Continuation of application No. 17/113,521, filed on Dec. 7, 2020, now Pat. No. 11,743,283, which is a
(Continued)

(51) Int. Cl.
*H04L 9/40* (2022.01)
*G07C 9/00* (2020.01)
(Continued)

(52) U.S. Cl.
CPC ...... *H04L 63/1433* (2013.01); *G07C 9/00309* (2013.01); *H04L 63/08* (2013.01);
(Continued)

(58) Field of Classification Search
CPC . H04L 63/1466; H04L 63/14; H04L 63/1408; H04L 63/1416; H04L 63/1441;
(Continued)

(56) References Cited

U.S. PATENT DOCUMENTS 4,210,780 A    7/1980   Hopkins
5,084,891 A    1/1992   Ariyavisitakul
(Continued)

FOREIGN PATENT DOCUMENTS

EP    1004726 A2    5/2000
WO    2009086031 A1    7/2009
WO    2016059451 A1    4/2016

OTHER PUBLICATIONS

National Intellectual Property Administration, PRC—Notification of First Office Action; received Dec. 20, 2020, 3 pgs.

*Primary Examiner* — Matthew T Henning
(74) *Attorney, Agent, or Firm* — Mandy Barsilai Fernandez; Frank D. Cimino

(57) ABSTRACT

A method of relay-attack resistant communications in a wireless communications system that includes a master wireless device (Master) sending a synchronization signal to a slave wireless device (Slave). The synchronization signal includes timing information including a common time reference and a timeslot duration for interlocking Master communication timeslots for Master and Slave communication timeslots so that an alternating TX and RX role pattern is provided. The Master analyzes Slave packet data received from the Slave to identify overlaps of a transmission from the Master and the slave packet data, and in a case of detecting overlap, suspends communications from Master to Slave to prevent a relay-attack.

20 Claims, 5 Drawing Sheets

Related U.S. Application Data continuation of application No. 15/200,896, filed on Jul. 1, 2016, now Pat. No. 10,897,477.

(51) Int. Cl.

| | | |
|---|---|---|
| *H04L 67/12* | (2022.01) | |
| *H04W 12/122* | (2021.01) | |
| *H04W 56/00* | (2009.01) | |
| *H04L 5/16* | (2006.01) | |
| *H04L 7/033* | (2006.01) | |
| *H04W 84/20* | (2009.01) | |

(52) U.S. Cl.
CPC ...... *H04L 63/1416* (2013.01); *H04L 63/1441* (2013.01); *H04L 63/1466* (2013.01); *H04L 67/12* (2013.01); *H04W 12/122* (2021.01); *H04W 56/001* (2013.01); *H04L 5/16* (2013.01); *H04L 7/033* (2013.01); *H04W 84/20* (2013.01)

(58) Field of Classification Search
CPC ....... H04L 5/16; H04L 63/1433; H04L 63/08; H04W 84/20; H04W 12/122; H04W 56/001; G07C 9/00309; H07L 67/12
See application file for complete search history.

(56) References Cited

U.S. PATENT DOCUMENTS

| | | | |
|---|---|---|---|
| 5,663,958 | A | 9/1997 | Ward |
| 5,844,517 | A | 12/1998 | Lambropoulos |
| 6,370,361 | B1 | 4/2002 | Hung |
| 6,803,851 | B1 | 10/2004 | Kramer |
| 7,987,363 | B2 | 7/2011 | Chauncey |
| 8,587,403 | B2 | 11/2013 | Ghabra |
| 10,897,477 | B2 | 1/2021 | Motos |
| 11,743,283 | B2 * | 8/2023 | Motos ............... H04L 63/1466 726/25 |
| 2005/0242923 | A1 | 11/2005 | Pearson |
| 2006/0164207 | A1 | 7/2006 | Wilcox |
| 2006/0164993 | A1 | 7/2006 | Teague |
| 2006/0188004 | A1 | 8/2006 | Kizu |
| 2006/0192697 | A1 | 8/2006 | Quick |
| 2010/0202436 | A1 | 8/2010 | Albert |
| 2011/0078549 | A1 | 3/2011 | Thueringer |
| 2014/0375420 | A1 | 12/2014 | Seiberts |
| 2015/0074805 | A1 | 3/2015 | Choi |
| 2015/0082427 | A1 | 3/2015 | Ivanchykhin |
| 2015/0222658 | A1 | 8/2015 | Kim |
| 2015/0235494 | A1 | 8/2015 | Creguer |
| 2015/0291127 | A1 | 10/2015 | Ghabra |
| 2015/0296348 | A1 | 10/2015 | Ghabra |
| 2016/0234008 | A1 | 8/2016 | Hekstra |
| 2017/0008488 | A1 | 1/2017 | Matsumoto |
| 2017/0021760 | A1 | 1/2017 | Calnek |

\* cited by examiner

RELAY-ATTACK RESISTANT COMMUNICATIONS

CROSS REFERENCE TO RELATED APPLICATIONS

This application is a continuation of U.S. patent application Ser. No. 17/113,521, filed Dec. 7, 2020, which is a continuation of U.S. patent application Ser. No. 15/200,896, filed Jul. 1, 2016, now U.S. Pat. No. 10,897,477, which applications are hereby incorporated by reference.

FIELD

Disclosed embodiments relate to preventing relay attacks involving signals relayed from one wireless device to another wireless device in a manner that deceives a transmitting entity of the proximity of the device intended to receive the relayed signals.

BACKGROUND

One example wireless communications system that can experience a threat referred to as a "relay-attack" involves modern vehicles. Modern vehicles generally support a remote entry system which may be referred to as a passive keyless entry (PKE), passive entry system (PES) or a Passive Entry Passive Start (PEPS) which will be the term used herein, that enables users to not need to press any buttons to obtain access to vehicle. PEPS systems use signals to transmit via modulated radio frequency (RF) or via an infrared signal. A fob, commonly called a keyfob, is a radio device used for this purpose comprises a small security hardware device that wirelessly communicates with another radio device that includes a PEPS controller in the vehicle. PEPS are usually configured so that when the user having electronic access control key fob (keyfob) including a radio device moves sufficiently close to the vehicle, the following occurs:
  a) The vehicle detects presence of the user (for instance when the user touches the door handles of the vehicle);
  b) The vehicle's radio device starts trying to establish an RF-based communication link with the user's keyfob;
  c) If the keyfob is within the range, the vehicle's radio device and the keyfob exchange security information; and
  d) If steps a-c are all completed successfully, access to the vehicle is granted, such as unlocking the door or starting the engine. However, typically starting the engine (passive start in PEPS) generally involves additional steps, including steps to ensure that the keyfob or authentication device is inside the vehicle.

Automotive keyless entry systems, especially PEPS systems, have been facing relay-attacks which permit a vehicle to be opened and possibly started and thus stolen without the owner's awareness. The relay-attack generally involves two thieves working in cooperation with each other. Each of the two thieves carries a wireless device (referred to as an attack kit) capable of receiving a signal from either the vehicle or the vehicle's keyfob and forwarding the received signal to the other thief after amplifying the signal. In one scenario, the thieves follow the vehicle and its driver. The driver stops at, for example, a store or a restaurant. Thief-1 stands adjacent to the parked vehicle and thief-2 follows and stands next to the owner of the vehicle (which may be inside the store or restaurant). Thief-1 pushes a button on the vehicle's door to initiate a door unlock operation, which normally requires a valid keyfob to be within a foot or two of the door. Upon pressing the door button, the vehicle broadcasts a wireless signal intended for reception by a valid, nearby keyfob.

The wireless device carried by thief-1 picks up the wireless signal being broadcast by the vehicle and relays the signal (albeit possibly at a different power level or frequency) through thief-1's attack kit to the attack kit of thief-2. Upon receiving the signal from thief-1, thief-2 replicates the signal in the format commensurate with the keyfob and transmits the replicated keyfob-compliant signal to the keyfob carried by the vehicle's owner (which presumably is within sufficient range of thief-2); thereby waking up the keyfob. The keyfob which receives the wireless signal and cannot distinguish thief-2's attack kit from the vehicle itself considers the attack kit carried by thief-2 as the vehicle and, as it is configured to do, transmits a wireless response signal to authenticate the keyfob to the vehicle. This response signal is then received by the attack kit of thief-2 which relays the signal back to the attack kit of thief-1. Thief-1 receives the response and replicates a wireless signal compatible with the vehicle. The vehicle's wireless communication system cannot distinguish a wireless signal from the attack kit of thief-1 from the keyfob itself and thus performs the designated operation (e.g., door unlock).

Another wireless relay-attack example that follows the same "thief-1 thief-2" argumentation lines can be perpetrated on a "property entry system", such as associated with a residential home. In such an attack, thief-1 and thief-2 coordinate to wait until the property owner leaves the home. When this happens, thief-1 inconspicuously follows the owner, whereas thief-2 accesses the entry system by enabling the relay attack.

SUMMARY

This Summary is provided to introduce a brief selection of disclosed concepts in a simplified form that are further described below in the Detailed Description including the drawings provided. This Summary is not intended to limit the claimed subject matter's scope.

Disclosed embodiments recognize a fundamental issue with wireless communication systems susceptible to relay-attacks such as described above is that standard wireless communication protocols are generally insensitive to relatively short transmission delays. For example, for a Passive Entry Passive Start (PEPS) system, there may be about ≤2 µs of uncertainty. Such standard communication protocols are built upon a "transmit and receive" paradigm, in which the keyfob's and the other radio device involved in a PEPS communication typically switch TX and RX roles several times. In embodiments where the other radio device is part of a vehicle, as used herein, the term "vehicle" can include any type of vehicle that can be driven such as automobiles, trucks, and busses, as well as boats, jet skis, snowmobiles, and other types of transportation machines that are operable with a wireless keyfob.

The physical properties of a wireless device makes it difficult to transmit a wireless signal at high power (0 dBm or above) and at the same time receive a weak wireless signal (−80 dBm or below). Thus, effectively the majority of the known low power and low cost wireless transmission protocols are half-duplex (or semi-duplex) in nature, meaning that the respective radio devices take turns to alternate sharing of the transmission medium.

As the respective radio devices switch roles between transmitting and receiving, there are inherent radio device uncertainties for switching ON and OFF the different analog circuitries in the respective radios (PAs, LNAs, Mixers, RF PLL, etc.). All known communication protocols account for such uncertainties by allowing a certain time window in which the expected response to a data packet might arrive. These time windows are typically in the microseconds (μs) range. For instance, the widely used Bluetooth low energy protocol allows up to 2 μs of uncertainty.

Accordingly, an electromagnetic radio signal travelling at the speed of light travels at 3.33 ns/meter (or 300 meter/μs), for an example Bluetooth low energy system signal, allows a malicious relay system to relay its information back and forth (round-trip) from a location up to around 300 meters away measured from the vehicle's digital radio device. Here, the 2 μs of uncertainty allows attackers close to the vehicle possessing malicious relay equipment to transmit the signals from the car to a keyfob sitting up to 300 meters away and relay back the response to the vehicle. All these communications can happen within 2 μs. This will generally be accepted as a legitimate communication by the vehicle's radio device. Relay-attacks are thus a serious threat to wireless entry systems, such as PEPS systems for modern automobiles.

Disclosed embodiments solve the relay-attack problem with a wireless communications system in which the switching between transmit (Tx) and receive (Rx) roles of the communicating devices (keyfob and vehicle's digital radio device) are interlocked to one another to be time bounded which prevents relay-attacks. By doing this, the time uncertainty can be reduced by about an order or magnitude which enables reducing the range of a potentially successful relay attack by about a factor of ten. Disclosed communication systems are configured to evidence that a collision exists if the time delay between the transmitter and receiver is in the range of at least about 100 ns to 200 ns which thus restricts the transmission time between communicating devices, resulting in limiting the physical range of a possible relay-attack to a maximum of about 20 or 30 meters. At such short distances, relay-attacks become ineffective as the keyfob owner actually needs to be in such a short range in the first place, thus deterring any malicious relay-attack activity as a malicious attacker would risk being detected by the legal owner of the keyfob at such short distances. For example, a person A (the legal owner) needs to be within 20 to 30 meters of the vehicle, then person B (an attacker) would likely not risk the attack as he or she might be easily detected and reported to the legal authorities.

Disclosed solutions do not require any specific or unconventional transmitting architectures, and thus can be readily applied to standard CMOS integrated radios as long as the digital radio is able to produce the information-carrying signal in the format described below and control the PA and RX mixers to be synchronized to the information-carrying signal. A disclosed digital radio supporting the disclosed communication method is used at both ends of the transmission (at both the other radio (e.g., vehicle's radio) and keyfob).

BRIEF DESCRIPTION OF THE DRAWINGS

Reference will now be made to the accompanying drawings, which are not necessarily drawn to scale, wherein.

DETAILED DESCRIPTION

Figure 1:
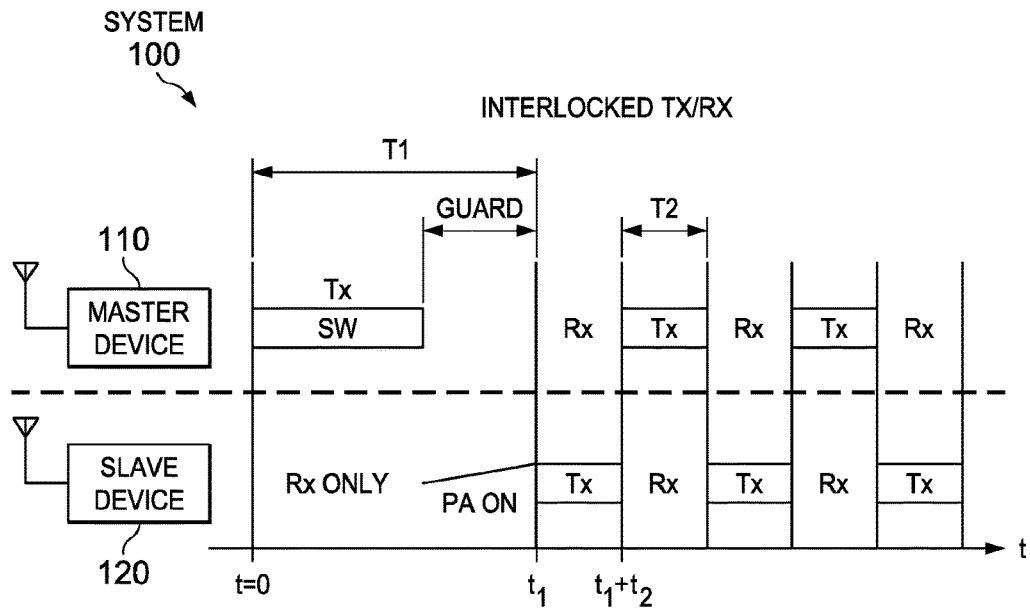
FIG. 1 shows a wireless communications system along with a timing diagram mechanism to the right for the respective radio devices for disclosed interlocked TX/RX communications between a master wireless device (Master) and a slave wireless device (Slave), according to an example embodiment.

Example embodiments are described with reference to the drawings, wherein like reference numerals are used to designate similar or equivalent elements. Illustrated ordering of acts or events should not be considered as limiting, as some acts or events may occur in different order and/or concurrently with other acts or events. Furthermore, some illustrated acts or events may not be required to implement a methodology in accordance with this disclosure.

Also, the terms "coupled to" or "couples with" (and the like) as used herein without further qualification are intended to describe either an indirect or direct electrical connection. Thus, if a first device "couples" to a second device, that connection can be through a direct electrical connection where there are only parasitic s in the pathway, or through an indirect electrical connection via intervening items including other devices and connections. For indirect coupling, the intervening item generally does not modify the information of a signal but may adjust its current level, voltage level, and/or power level.

FIG. 1 shows a wireless communications system 100 along with a timing diagram mechanism to the right for the respective radio devices for disclosed interlocked TX/RX communications between a Master 110 and a Slave 120, according to an example embodiment. The Slave 120 is a keyfob or any radio device with valid credentials able to grant access. The Master 110 (generally the initiator of the communication, originator of the authentication query) is located in the resource that needs a validation to perform an action that only can happen in the presence of the Slave 120 (i.e., listening device, owner of the keyfob).

Although the communications system 100 is generally described with respect to preventing a relay-attack of a PEPS system included within a vehicle, disclosed embodiments are not limited to preventing relay-attacks on vehicle PEPS and may be similarly used to thwart relay attacks on any system susceptible to attacks where access may be gained by simply relaying signals from one device to another device in an effort to deceive a transmitting entity of the proximity of a device intended to receive the relayed signals. For example, home security systems, commercial building badge access systems, credit cards, garage door openers, and keyless entry devices on hotel room doors can all benefit from disclosed embodiments.

Disclosed systems define a time-strict and thus distance-bound interlocked TX and RX communication protocol. In communications system 100, the Master 110 and the Slave 120 are communicating and exchanging information in the form of data packets with one another. The Master 110 can initiate the communication so that the Slave 120 responds to the Master's initial request. However, another approach can be when an initiating device (Master 110) periodically transmits its Synchronization Word (SW) sequence and goes into the interlocked section of the communications (executes the upper part of FIG. 1 periodically). The Master 110 can later check if it has captured any response from the Slave 120. Such a periodic, automatic scheme, will automatically detect the proximity of a Slave 120 (scanning or listening device) once it gets into the RF range.

In the initial state during the first time interval shown as T1 the Master 110 is shown in the transmission mode (TX), whereas the Slave 120 is in the receive mode (RX). The time of the first system transmission being a SW TX from the Master 110 shown as t=0 is used as the absolute anchor point and (common time) reference for the transmissions from both the Master 110 and the Slave 120 in communications system 100. The time is held common within the communications system 100 due to the need for synchronization between Master 110 and Slave 120. However, the time for the Master 110 and for the Slave 120 is never absolutely identical (i.e. no reference to absolute time instants). Since the Master 110 and Slave 120 use different clocks that are physically distant, they can never be perfectly synchronous. The Master 110 has its timing grid (given by its local clock).

The SW in one particular embodiment is a 32 bit word. However, the SW can generally have at least 16 bits to provide valid synchronization words, or more than 32 bits (e.g., 64 bits). The SW contains a known digital word for the Slave 120 as a receiver used by the Slave 120 to scan precisely for this particular bit pattern and to be able to discern this pattern in the presence of noise. The SW does not contain information per-se (as its contents are already known by the Slave 120) but its reception triggers the chain sequence of disclosed interlocked TX/RX communication shown in FIG. 1.

When communication happens at short distances the propagation time for the SW is negligible (much less than a bit duration, such as ≤0.1 bit duration) and thus the SW are mostly aligned in time. In this respect the SW allows the Slave 120 to synchronize itself to the timing of the Master 110. When communication happens at relatively long distances (compared to the bit duration) the time alignment between the Master 110 and Slave 120 will be displaced and the disclosed interlocking mechanism will fail evidenced by collisions where samples arriving from the other device are perturbed by the local signals (being much stronger) that are being transmitted by the device at that same time the device is receiving.

T2 may be termed as an "interlocked transmission window". Only for short distances can the transmission windows (T2) of the Master 110 and Slave 120 be aligned in time to avoid collisions. As described above, alignment generally only happens to the closest local timing tick.

The Slave 120 thus detects the SW. Upon detection of the SW from the Master 110 the Slave 120 will power on its transmission chain, such as Tx chain 230 in FIG. 2 described below. This protocol allows for the guard time shown in FIG. 1 as "Guard" that follows the SW to allow specific receivers implementing this protocol to effectively power its transmission chain and be ready for the second part of the protocol. For Master 110 the time between the start of its transmission (of the SW) and the arrival of the first bit transmitted from the Slave 120 can be seen to be fixed by the T1 value.

After T1, the Master 110 and Slave 120 enter a disclosed interlocked TX/RX transmission. Master 110 and Slave 120 each take turns in swapping their TX/RX roles every T2 where the Master 110 and Slave 120 are always either transmitting or receiving bits (e.g. IQ samples). The captured bits upon receipt are available at both ends after the exchange has been completed. Each transmitting or receiving role for the Master 110 and the Slave 120 lasts for a duration of T2. The swapping of roles is essentially instantaneous and is synchronized by the Master 110 and Slave 120 to happen simultaneously between the respective devices each at T1+i*T2 time instants (i=0 . . . integer number of swaps).

Figure 5:
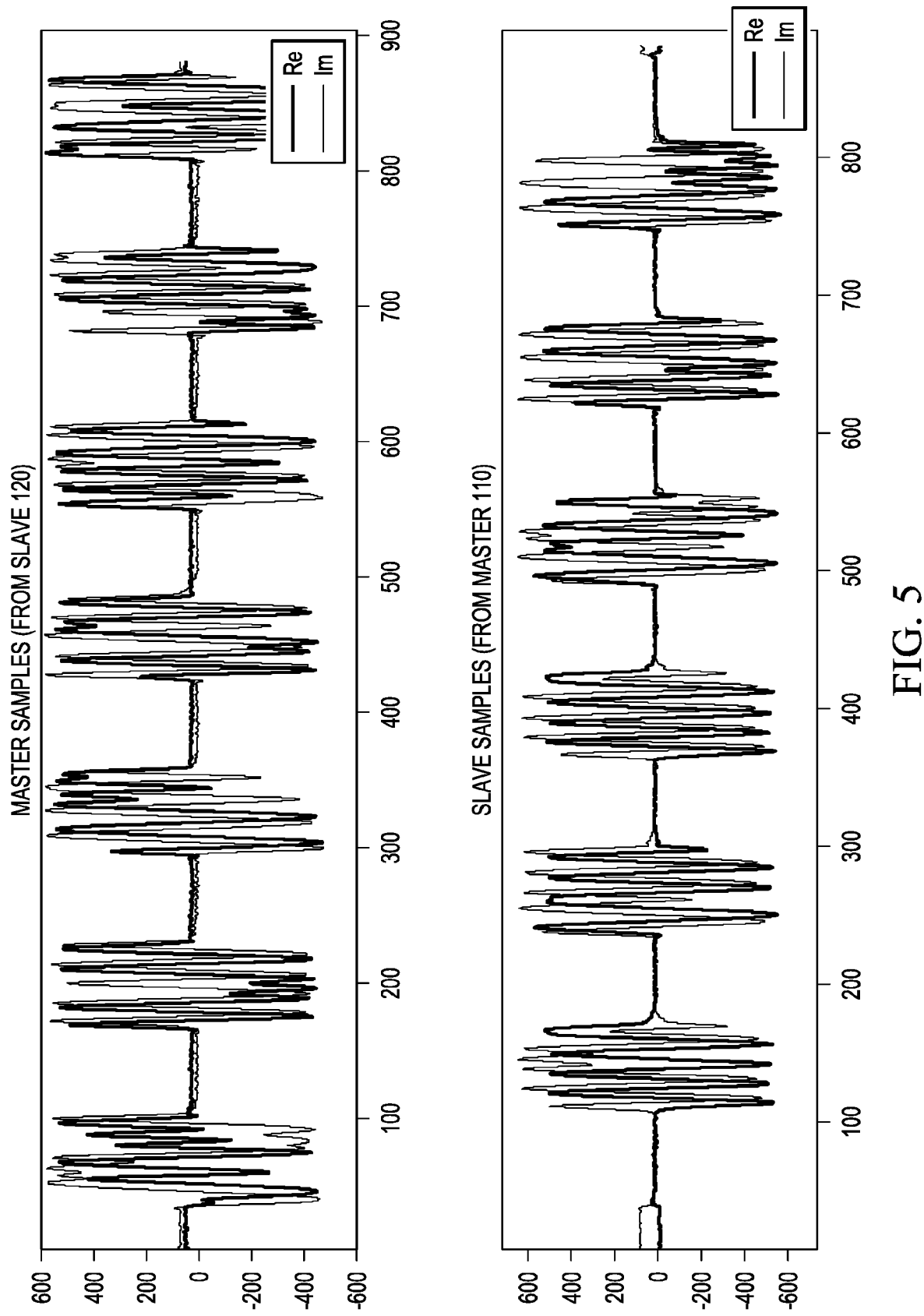
FIG. 5 shows example actual measured captured IQ master Samples (received from the Slave) and slave samples (received from the Master) for a half-duplex arrangement, according to an example embodiment.

By system construction, transmission delays in communications system 100 break the strict interleaving and create collisions (time overlapping TX signals at both the Master 110 and Slave 120). A transmission delay shifts the lower part of FIG. 1 towards the right (later in time). The end of the transmission from the Slave 120 collides with the start of the transmission of the Master 110 (at the next transmission window). For the Master 110, this means that the end of the received packet from the Slave 120 is distorted. This is shown in FIG. 5 described in the Examples below, as the frequency samples are distorted. In one specific embodiment T2=8 μs, T1=32 μs, the bit Rate=2 Mb/s, and the frequency deviation (Fdev)=500 kHz. Fdev corresponds to the difference to the carrier frequency. Transmission of a bit 0 is normally achieved by transmitting a signal whose frequency is Fdev less than the carrier frequency (a negative frequency deviation), whereas transmission of bit of binary 1 is achieved by transmitting a signal whose frequency is Fdev higher than the carrier frequency (a positive frequency deviation).

Figure 2:
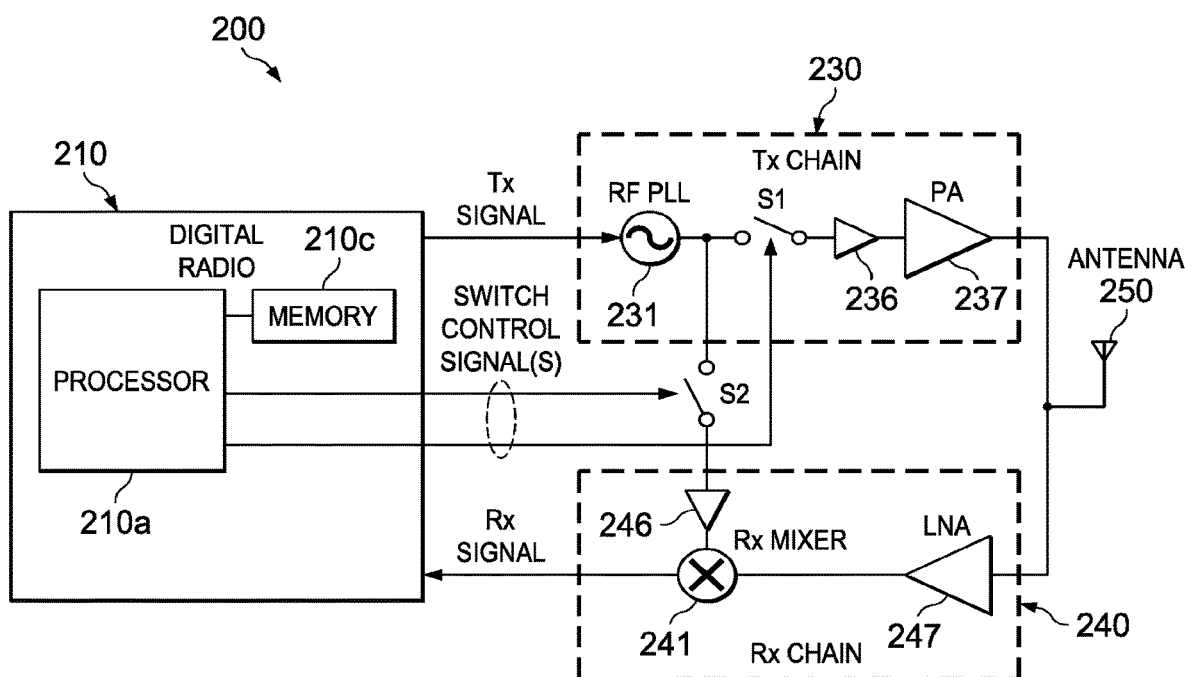
FIG. 2 shows example radio architecture (radio) that enables disclosed interlocked TX/RX communications, according to an example embodiment.

In order to enable the disclosed interlocked TX/RX communications mode, reference is made to the example Radio Architecture (Radio) 200 shown in FIG. 2. All of Radio 200 including the processor, memory, and analog components (RF) except generally the antenna can be on 1 chip (e.g. silicon) or usually a system on a chip (SOC) as a MCU or other processor and a radio combo device. Radio 200 includes a digital radio 210 that is configured to enable its Tx chain 230 path and its Rx chain 240 path to be operable simultaneously. Digital radio 210 includes a processor 210a with an associated memory 210c.

The processor 210a acts as a controller which provides the switch control signals shown coupled to S1 and S2, such as to the gates of metal-oxide-semiconductor field-effect transistor switches. Processor 210a ensures that the switch control signals that arrive at S1 and S2 are precisely aligned (synchronized) with the information-carrying TX signal. It is important for disclosed interlocked TX/RX communications to function properly that the signal generated by the RF PLL 231 and the respective switch control signals that arrive at S1 and S2 are aligned as precisely as possible. When $r(t)=\cos(2\pi f_c t+\theta(t))$ then S1 is closed and thus the power amplifier (PA) 237 is active (transmission state), whereas when $r(t)=\cos(2\pi f_c t)(\theta(t)=0)$ then S2 is closed and the Rx chain 240 is in the active state (reception state). The switch between transmission and reception state involves two components: $\theta(t)$ and the state of the S1/S2 switches. The state of the switches S1/S2 is a direct function of the control signal from the processor 210a that controls that state (open or closed) of S1 and S2. The switching between the transmission and reception state for the respective radio devices happens simultaneously or generally as described above at least with an uncertainty that is less than about a tenth of the duration of a bit.

For example, digital radio 210 can be implemented in CC2650 and CC1350 radios provided by Texas Instruments Incorporated. An RF phase lock loop (RF PLL) 231 in the Tx chain 230 that functions as an oscillator can take the baseband TX signal received from the digital radio 210 and generate an IQ modulated RF signal as described by the following equation for a sinusoidal wave:

$$r(t)=\cos(2\pi f_c t+\theta(t))$$

Signal modulation changes a sinusoidal wave (shown as a cos) to encode information. An amplitude term (a constant, rather than 1 in the equation above) can optionally precede the cos term. Where $f_c$ is the RF carrier frequency with $2\pi f_c t$ being the frequency term and $\theta(t)$ being the modulating term (phase), information-carrying signal. The Tx chain 230 includes a buffer (or preamplifier) 236 in series with the PA 237. The PA 237 and buffer 236 are enabled by the switch S1 shown, so that when the S1 switch is enabled (closed) the output of the RF PLL 231 becomes pre-amplified towards the PA 237. The output of the PA 237 sends an amplified RF signal (e.g., >0 dBm) towards the antenna 250.

The Rx chain 240 includes an Rx Mixer 241 and a buffer (or preamplifier) 246. The Rx Mixer 241 is enabled by switch S2 shown, so that when the S2 switch is enabled (closed) the output of the RF PLL 231 is fed to the Rx mixer 241. A LNA 247 is for receiving the input from the antenna 250 (e.g., a weak RF signal <−80 dBm) and amplifying it towards the Rx Mixer 241. The Rx Mixer 241 takes the output of RF PLL 231 (when S2 is closed) and the output of the LNA 247 and produces a mixed-down version of it.

When a device (Master 110 or Slave 120) is in the TX role $\theta(t)$ contains the information-carrying signal, S1 is closed, and S2 is open so that the PA 237 gets the RF PLL signal from RF PLL 231. When a device is in the RX role $\theta(t)$ is zero, so that the RF PLL 231 only produces a carrier signal, S1 is open, and S2 is closed so that Rx Mixer 241 receives the RF PLL signal from the RF PLL 231.

A significant disclosed concept that enables disclosed interlocked TX/RX communication method is to realize that the switching between the TX and RX roles for the Master 110 and Slave 120 can be made almost instantaneous if the PA 237 and LNA 247 are kept powered at all times while interlocked communication is on-going and the RF PLL 231 is kept powered and modulating while interlocked communication is on-going. This enables the above-described when a device is in TX role $\theta(t)$ contains the information-carrying signal, S1 is connected, S2 is open (PA 237 gets the RF PLL 231 signal), and when a device is in the RX role $\theta(t)$ is zero so that the RF PLL 231 only produces a carrier signal, S1 is open, and S2 is connected so that Rx Mixer 241 gets the RF PLL 231 signal.

Figure 3:
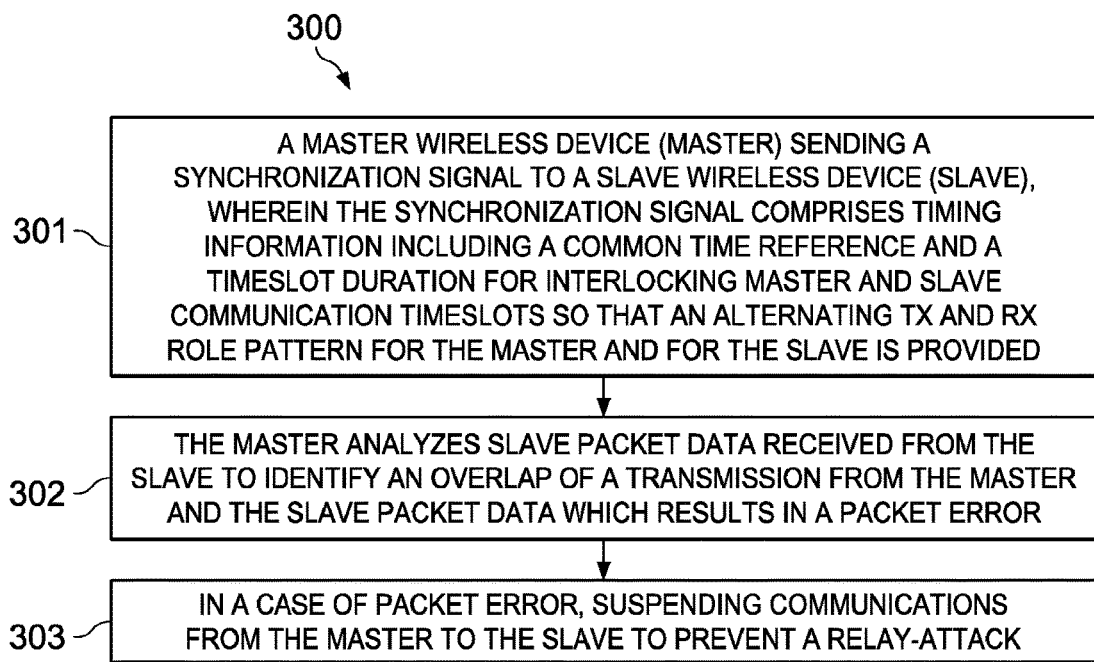
FIG. 3 is a flow chart that shows steps in an example method of relay-attack resistant interlocked TX/RX communications, according to an example embodiment.

FIG. 3 is a flow chart that shows steps in an example method 300 of relay-attack resistant interlocked TX/RX communications, according to an example embodiment. Step 301 comprises a master wireless device (Master) sending a synchronization signal to a slave wireless device (Slave), wherein the synchronization signal comprises timing information including a common time reference and a timeslot duration for interlocking Master and Slave communication timeslots so that an alternating TX and RX role pattern for the Master and for the Slave is provided. Step 302 comprises the Master analyzing Slave packet data received from the Slave to identify an overlap of a transmission from the Master and the Slave packet data which results in a packet error. Step 303 comprises in a case of packet error, suspending communications from the Master to the Slave to prevent a relay-attack. Method 300 can be used in a variety of systems including in a remote PEPS system, a wireless car access system, or a wireless door lock system.

As described above, the timing information can comprise a digital word having a particular bit pattern that is also stored by the Slave, and the Slave can scan the synchronization signal for the particular bit pattern, and responsive to verifying the particular bit pattern powering on a Tx chain of the Slave. The timing information can further comprises a guard time after the digital word that allows time for the Slave to transition into a TX mode including stabilizing to a steady state after the powering on of the Tx chain of the Slave.

EXAMPLES

Disclosed embodiments are further illustrated by the following specific Examples, which should not be construed as limiting the scope or content of this Disclosure in any way. All the numbers described in these examples and in the corresponding FIGS. (e.g., 8, 48, 32, 16, etc.) are all only example values.

Figure 4:
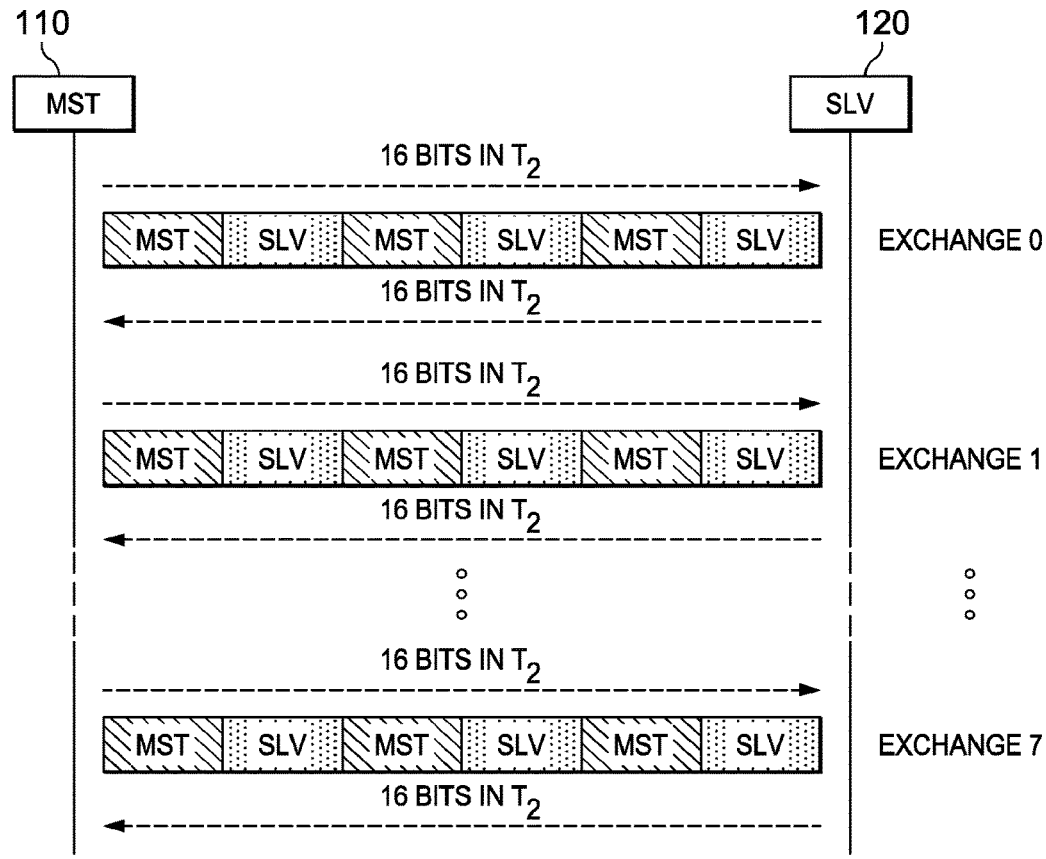
FIG. 4 shows a disclosed interlocked TX/RX communications protocol where transmissions from the Master and the Slave happen each within its interlocked transmission window T2, according to an example embodiment.

FIG. 4 shows a disclosed protocol in a full duplex arrangement, seen from a higher layer (DATA LINK layer) where transmissions from the Master 110 and the Slave 120 happen each within its "interlocked transmission window" being a time defined by T2. The protocol only apparently behaves as being full-duplex, but it is actually a fine-grained interlocked/interleaved semi-duplex communication at the PHYSICAL layer. There is no timeslot (a defined time interval in a schedule) for the Master 110 to transmit followed by a timeslot for the Slave 120 to transmit (as in traditional communication methods), but rather a single combined timeslot in which data is exchanged between Master 110 and the Slave 120 in an interlocked fashion. FIG. 4 also shows that within an exchange, the data from the Master 110 (towards the Slave 120) and the data from the Slave 120 (towards the Master 110). At the PHYSICAL layer, each transmission fills in the gap left by the other device.

At the DATA LINK layer, an information exchange occurs in the same timeslot so the protocol can almost be seen as being fully synchronous. This can be imagined as drawn fine lines on a paper with very fine interleaving. At a "distance" it appears the lines are a single block. Equally, from a higher layer, the communication appears to go in both directions simultaneously, but in reality they are instead switching roles quickly thus occupying separate timeslots.

At each of the 8 information exchanges (shown as 0 to 7), it is shown 48×2 total bits of information are passed between the Master 110 and Slave 120. There are six T2 periods shown, three allocated for the MST 110 to transmit and three for the SLV 120 to transmit. During each of these T2 periods, 16 bits are transferred (16×3=48 total bits in each direction). The 48 bits in each direction can comprise in one embodiment 32 bits of DATA, and 16 bits of cyclic redundancy check (CRC). CRC as known in the art is an error-detecting code commonly used in digital networks and storage devices to detect accidental changes to raw data. The Master 110 and Slave 120 can thus simultaneously exchange two challenge-response per communication block (one in each direction). This disclosed scheme also breaks Record-Replay attacks. Higher level protocols can be built on top of this structure.

FIG. 5 shows example Captured IQ master samples (received from the Slave 120) and Slave samples (received from the Master 110) for a half-duplex arrangement. The x-axis is the sample count which equals time when multiplied by the sampling period. At 0 distance or a very short distance (e.g., <10 m) the propagation delay is much less than the bit duration (e.g., ≤0.1 bits). The time is in nsec and the y-axis is the signal amplitude. At 0 (zero) distance or a very short distance the signal propagation delay is significantly less than the bit duration. The SW from the Master 110 is transmitted between about 40 nsec and 100 nsec on the time scale. I is the real part (Re) and Q is the imaginary (Im) part. The processor 210a in FIG. 2 can run offline demodulation based on these modulated samples.

Figure 6:
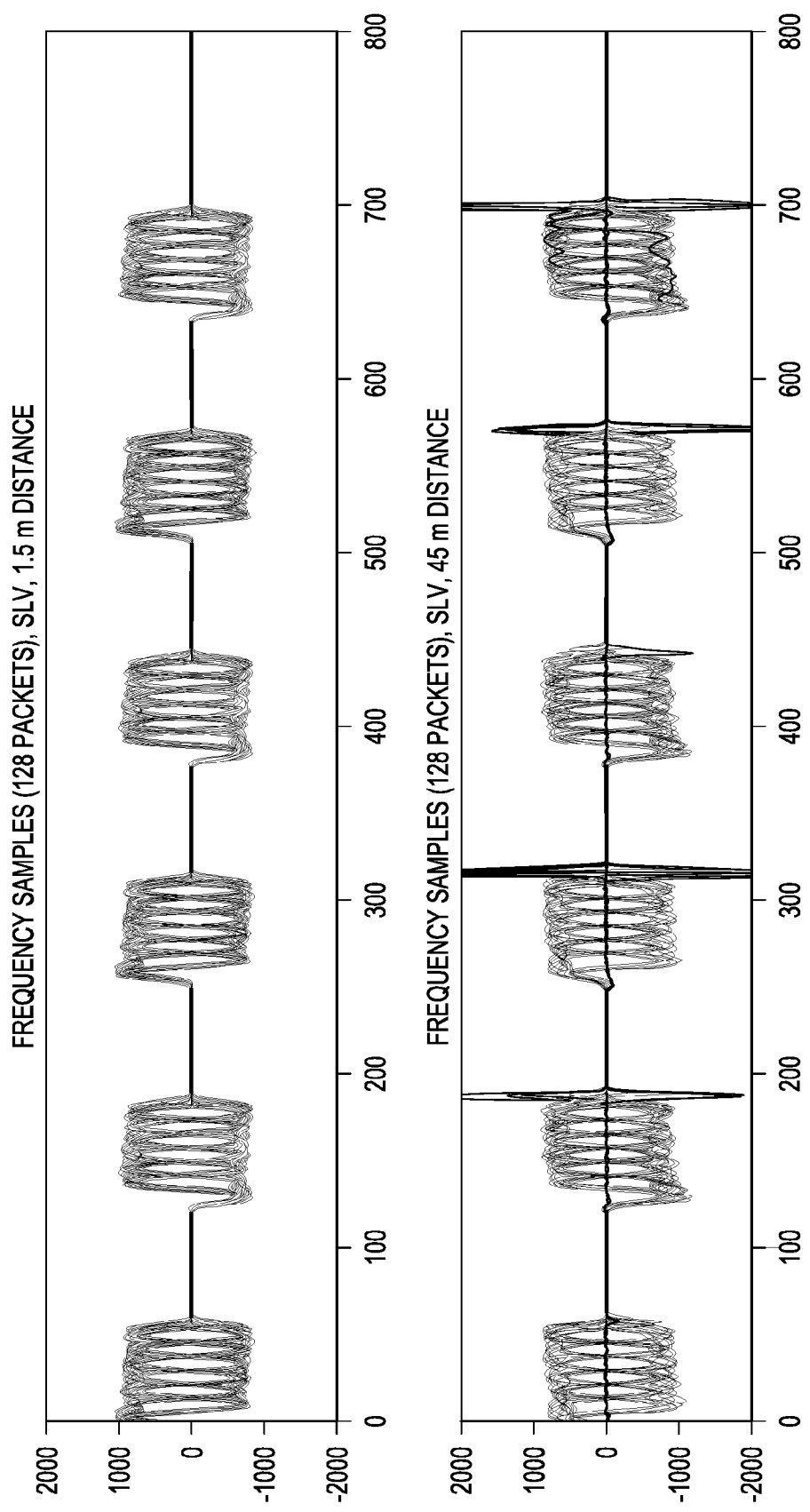
FIG. 6 shows actual measured results from demodulated frequency modulated (FM) Samples at the Slave for a 1.5 m distance between the Master and Slave for a half-duplex arrangement showing no collisions, and for a 45 m distance between Master and Slave showing collisions.

FIG. 6 shows results from demodulated FM samples captured at the Master 110 from the Slave 120 for a 1.5 m distance between the Master 110 and Slave 120 for a half-duplex arrangement showing no collisions, and for a 45 m distance between Master 110 and the Slave 120 showing collisions. The x-axis is sample count which equals to time (when multiplied by the sampling period.) In the case of collisions, large spikes at the end of packets result that reflect that the demodulation algorithm fails as the captured samples arriving from the other device are perturbed by the local signals (being much stronger) that are leaving the device (being transmitted) at that same time.

Due to the tightly interlocked nature of the disclosed interlocked communications protocol, transmission delays quickly become disruptive. As described above, a transmission delay shifts the Slave TX/RX timing to the right (later in time) and the distance between the Master 110 and Slave 120 is sufficiently large (e.g., ≥20 m) results in a shift in the timing of the Slave TXs causing collision with the allocated timeslots of the Master 110 (so that as described-above during collisions at the Master 110 the Master 110 is transmitting while receiving packets from the Slave 120). Rather than collisions, the Slave 120 will experience wrong sampling instants. The Slave's 120 receiving window will be shifted so that the bits from the Master 120 will be sampled at the wrong instants. This will also lead to transmission errors. For a simple example, if the Master 110 sends a 0 1 0 1 bit pattern but the Slave 120 only opens its RX window just before the second bit the Slave 120 then receives 1 0 1 x (x=noise).

Figure 7:
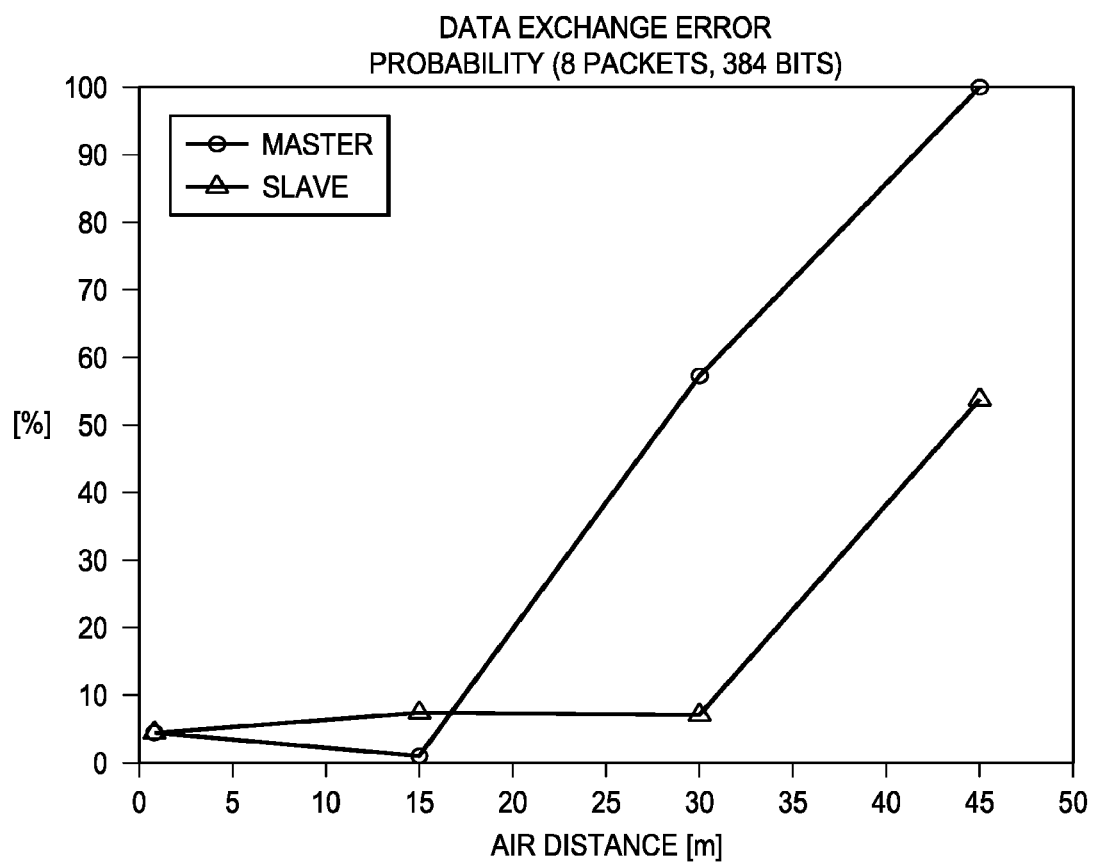
FIG. 7 shows actual measured % errored packets vs distance (between Master and Slave) measured results.

FIG. 7 shows the measured % errored packets vs distance (between Master 110 and Slave 120) results, where the devices were communicating at 2 Mb/s (bit time of 500 ns). The data exchange was a collection of 8 packets (384 bits in total, 256 bits of information). At a distance of up to 15 meters (100 ns round-trip delay) the delay is seen to not interfere significantly with communications. At 30 meters (200 ns round-trip delay) the Master 110 sees 55% of the data exchanges with errors. A packet error is produced if one bit or more is not correct. At 45 meters (300 ns round-trip delay) the Master 110 sees 100% of errors, and 55% for the Slave 120. The Master 110 is more sensitive to delays compared to the Slave 120 since disclosed timing is referred to the start of the Master's first bit of transmission (in the SW). This is because data coming from Slave 120 received by the Master 110 sees a double the delay (round-trip), whereas data in the Slave 120 only sees a single trip delay.

As another specific example, one can set the bit time of the wireless devices to 0.5 µs (2 Mb/s) and T2 to be 8 µs (16 bits transmitted in each Tx interval). A transmission delay of just 250 ns creates a half-bit (250 ns/0.5 µs) overlap (collisions) on the TX/RX switching instants thus dramatically increasing the probability of bit errors and eventually leading to a packet error having at least one corrupted bit. A round-trip time of 250 ns would maximally allow a distance of 37 meters (speed of light in a vacuum=$3 \times 10^8$ m/sec), and this is only counting signal propagation times. Any malicious electronic circuit(s) added into this process (PA, mixers, LNAs) would further increase the propagation delay, and thus reduce the range of a possible successful relay-attack.

Those skilled in the art to which this disclosure relates will appreciate that many other embodiments and variations of embodiments are possible within the scope of the claimed invention, and further additions, deletions, substitutions and modifications may be made to the described embodiments without departing from the scope of this disclosure.

What is claimed is:

1. A method comprising:
   transmitting, during an initialization phase and by a first wireless device, a first packet that includes an indication of a first timeslot duration; and
   during an interlocked phase,
      alternating, by the first wireless device, between transmit and receive modes during respective timeslots of a plurality of timeslots, wherein each of the plurality of timeslots has a duration equal to the first timeslot duration,
      receiving a second packet from another wireless device when the first wireless device is in the receive mode during a first timeslot of the plurality of timeslot,
      transmitting a third packet when the first wireless device is in the transmit mode during a second timeslot of the plurality of timeslots, and
      suspending, by the first wireless device, wireless communication with the another wireless device in response to detecting an overlap between transmission of the third packet and reception of the second packet.

2. The method of claim 1, wherein detecting the overlap between transmission of the third packet and reception of the second packet comprises detecting an error in the second packet.

3. The method of claim 1, further comprising periodically transmitting, by the first wireless device, the first packet.

4. The method of claim 1, wherein a duration of the initialization phase is longer than the first timeslot duration.

5. The method of claim 1, wherein the first wireless device comprises:
   a transmission chain comprising a phase-locked-loop (PLL) having an output coupled to a power amplifier via a first switch; and
   a receive chain comprising a first amplifier and a mixer, the mixer having a first input coupled to an output of the first amplifier, and a second input coupled to the output of the PLL via a second switch.

6. The method of claim 5, further comprising keeping the PLL, the power amplifier and the first amplifier powered during the interlocked phase.

7. The method of claim 5, further comprising:
   closing the first switch and opening the second switch when the first wireless device is in the transmit mode; and
   opening the first switch and closing the second switch when the first wireless device is in the receive mode.

8. The method of claim 1, wherein the third packet comprises a cyclic redundancy check (CRC).

9. The method of claim 1, wherein the another wireless device is a keyfob.

10. The method of claim 1, further comprising, powering a transmit chain of the another wireless device during the initialization phase.

11. The method of claim 10, further comprising alternating, by the another wireless device, between transmit and receive modes during respective timeslots of the plurality of timeslots, wherein the another wireless device is in the transmit mode when the first wireless device is in the receive mode, and wherein the another wireless device is in the receive mode when the first wireless device is in the transmit mode.

12. The method of claim 11, further comprising keeping the transmit chain of the another wireless device powered during the interlocked phase.

13. The method of claim 1, wherein the first packet comprises a synchronization sequence.

14. The method of claim 13, wherein reception, by the another wireless device, of the synchronization sequence triggers powering of a transmit chain of the another wireless device.

15. The method of claim 1, wherein the first packet comprises 16 bits or more.

16. The method of claim 1, wherein the first timeslot duration is 8 μs.

17. A wireless device comprising:
a memory; and
a processor configured to:
    transmit, during an initialization phase, a first packet that includes an indication of a first timeslot duration,
    during an interlocked phase,
        alternate between transmit and receive modes during respective timeslots of a plurality of timeslots, wherein each of the plurality of timeslots has a duration equal to the first timeslot duration,
        receive a second packet from another device when the wireless device is in the receive mode during a first timeslot of the plurality of timeslot,
        transmit a third packet when the wireless device is in the transmit mode during a second timeslot of the plurality of timeslots, and
        suspend wireless communication with the another device in response to detecting an overlap between transmission of the third packet and reception of the second packet.

18. The wireless device of claim 17, further comprising:
a transmission chain comprising a phase-locked-loop (PLL) having an output coupled to a power amplifier via a first switch; and
a receive chain comprising a first amplifier and a mixer, the mixer having a first input coupled to an output of the first amplifier, and a second input coupled to the output of the PLL via a second switch, wherein the wireless device is configured to keep the PLL, the power amplifier, and the first amplifier powered during the interlocked phase.

19. An apparatus comprising:
a transceiver; and
a processor configured to:
    transmit, during an initialization phase and via the transceiver, a first packet that includes an indication of a first timeslot duration,
    during an interlocked phase,
        alternate between transmit and receive modes during respective timeslots of a plurality of timeslots, wherein each of the plurality of timeslots has a duration equal to the first timeslot duration,
        receive, via the transceiver, a second packet from another device when in the receive mode during a first timeslot of the plurality of timeslot,
        transmit, via the transceiver, a third packet when in the transmit mode during a second timeslot of the plurality of timeslots, and
        suspend wireless communication with the another device in response to detecting an overlap between transmission of the third packet and reception of the second packet.

20. The apparatus of claim 19, wherein the apparatus is a vehicle.

* * * * *